US010756975B2

(12) United States Patent
Vu et al.

(10) Patent No.: US 10,756,975 B2
(45) Date of Patent: Aug. 25, 2020

(54) MULTIPLE SITE ROLLING UPGRADE PROTOCOL

(71) Applicant: AVAGO TECHNOLOGIES INTERNATIONAL SALES PTE. LIMITED, Singapore (SG)

(72) Inventors: Bao Vu, San Ramon, CA (US); Todd Shoemaker, Andover, MN (US); David Hegland, Rogers, MN (US); Gregory Wagner, Blaine, MN (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 425 days.

(21) Appl. No.: 15/811,377

(22) Filed: Nov. 13, 2017

(65) Prior Publication Data
US 2018/0167269 A1    Jun. 14, 2018

Related U.S. Application Data

(60) Provisional application No. 62/433,529, filed on Dec. 13, 2016.

(51) Int. Cl.
H04L 12/24       (2006.01)
G06F 8/656       (2018.01)
G06F 11/20       (2006.01)
H04L 12/28       (2006.01)

(52) U.S. Cl.
CPC .......... H04L 41/082 (2013.01); G06F 8/656 (2018.02); G06F 11/2002 (2013.01); H04L 41/0869 (2013.01); H04L 12/2863 (2013.01)

(58) Field of Classification Search
CPC ................. G06F 8/65–66; G06F 11/20–2097
See application file for complete search history.

(56) References Cited

U.S. PATENT DOCUMENTS 6,393,535 B1 *  5/2002  Burton ............... G06F 3/0613
                                                       711/154
6,675,258 B1 *  1/2004  Bramhall ............... G06F 8/65
                                                       711/100

(Continued)

OTHER PUBLICATIONS

Brocade Fabric OS Extension Configuration Guide, Supporting Fabric OS 8.0.1, Apr. 22, 2016, 179 pages.

(Continued)

Primary Examiner — Emmanuel L Moise
Assistant Examiner — Julian Chang
(74) Attorney, Agent, or Firm — Xsensus LLP

(57) ABSTRACT

Improving the multi-site software update for extension switches by automatically assigning extension switches at each data center with a role and then providing state messages between the extension switches to stage software update operations between the various extension switches that are involved. This allows the network administrator to commence the software update process on the extension switches at each data center without waiting for any extension switch to complete operations. The extension switches communicate with each other and the software update process completes automatically, with all extension switches at all data centers updated without further network administrator input.

12 Claims, 11 Drawing Sheets

(56) References Cited

U.S. PATENT DOCUMENTS

| | | | | |
|---|---|---|---|---|
| 7,228,538 B1* | 6/2007 | Burton | G06F 8/656 | 717/170 |
| 8,010,713 B2* | 8/2011 | Matumura | G06F 3/0607 | 710/8 |
| 2005/0193228 A1* | 9/2005 | Miki | G06F 11/2092 | 714/5.11 |
| 2006/0085564 A1* | 4/2006 | Bomhoff | G06F 8/65 | 710/8 |
| 2007/0174601 A1* | 7/2007 | Douglas | G06F 8/65 | 713/1 |
| 2008/0109647 A1* | 5/2008 | Gavens | G06F 8/65 | 713/2 |
| 2008/0109798 A1* | 5/2008 | Gavens | G06F 8/65 | 717/168 |
| 2008/0163190 A1* | 7/2008 | Shirota | G06F 8/65 | 717/170 |
| 2010/0162223 A1* | 6/2010 | Hattori | G06F 8/656 | 717/168 |
| 2010/0318981 A1* | 12/2010 | Helman | G06F 3/0647 | 717/168 |
| 2011/0010706 A1* | 1/2011 | Lambert | G06F 9/45558 | 718/1 |
| 2011/0022828 A1* | 1/2011 | Delaney | G06F 8/656 | 713/2 |
| 2012/0198434 A1* | 8/2012 | Dirstine | G06F 8/65 | 717/170 |
| 2013/0246706 A1* | 9/2013 | Matsumura | G06F 8/65 | 711/114 |
| 2014/0123121 A1* | 5/2014 | Chiu | G06F 8/654 | 717/168 |
| 2015/0006949 A1* | 1/2015 | Bittles | G06F 11/2007 | 714/4.11 |
| 2015/0212760 A1* | 7/2015 | Goel | G06F 3/0605 | 714/6.3 |
| 2015/0268946 A1* | 9/2015 | Groover | G06F 16/22 | 717/168 |
| 2016/0062761 A1* | 3/2016 | Muroyama | G06F 8/65 | 717/171 |
| 2017/0052777 A1* | 2/2017 | Oikawa | G06F 8/65 | |
| 2018/0107609 A1* | 4/2018 | Kumar KN | G06F 8/654 | |
| 2018/0165082 A1* | 6/2018 | Batchelor | G06F 8/65 | |
| 2018/0217833 A1* | 8/2018 | Teisberg | H04L 41/082 | |

OTHER PUBLICATIONS

Brocade Fabric OS Extension Administrator's Guide, Supporting Fabric OS v7.4.0, May 29, 2015, 148 pages.

* cited by examiner

- Primary DP has Main Tunnel (MT) and Remote Backup Tunnel (RBT)
- Failover DP has Local Backup Tunnel (LBT)

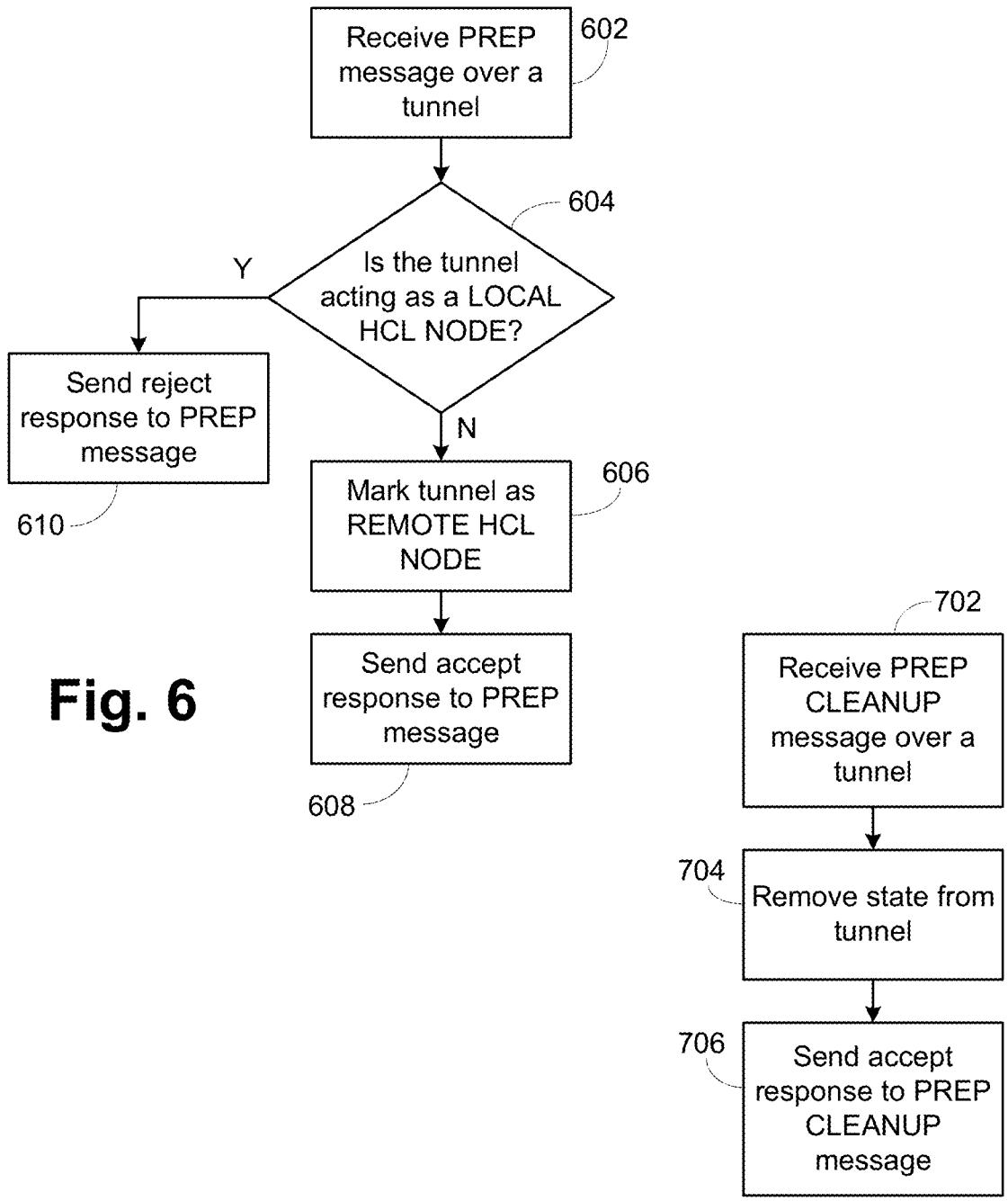

MULTIPLE SITE ROLLING UPGRADE PROTOCOL

CROSS REFERENCE TO RELATED APPLICATIONS

This application claims the benefit under 35 U.S.C. § 119(e) of U.S. Provisional Pat. App. Ser. No. 62/433,529 entitled "Multiple Site Rolling Upgrade Protocol," filed Dec. 13, 2016, which is hereby incorporated by reference as if reproduced in its entirety.

This application is related to U.S. Pat. No. 9,357,038 entitled "Lossless Connection Failover for Mirrored Devices," which is hereby incorporated by reference as if reproduced in its entirety.

BACKGROUND OF THE INVENTION

(1) Field of the Invention

The invention relates to network switches, and more particularly to network switches that provide redundant links and need firmware updates.

(2) Description of Related Art

Data centers are a major element in most large businesses. To maintain operation of the business during downtime events, the data centers are often replicated at remote locations. To allow for the replication of the data, long distance links or wide area network (WAN) links are used to connect the two data centers. In some cases redundant WAN links are used to maintain the replicated state. With redundant WAN links, should one link go down, the traffic can failover to the second link and the data centers can remain replicated. In some cases, specialized switches are used to provide the WAN extension capabilities discussed above. In the redundant situations, multiple extension components can be used at each location to provide the failover capability.

As with all electronic devices, software updates generally become available for these extension switches. It is then necessary to apply the updates to the extension switches. In many cases this update process involved taking the extension switches offline while the software was updated. This meant that during the update period the two data centers were losing synchronized status. To address this downtime problem, a process for hot code loading (HCL) the software was developed if the installation included redundant extension devices at each data center and redundant WAN links between the data centers. In this prior HCL process when the software of the extension switches at one data center needed to be updated, the software was provided to one of the redundant extension switches, the data traffic was failedover to the other extension switch, the software was installed and then the data traffic was failedback to the updated extension switch. The process was then repeated for the other extension switch and then the update was done for the data center. This process is described in much more detail below.

While the HCL process greatly improved the synchronization between the data centers during the update process, it was very administrator intensive. The network administrator had to start the process on every extension switch manually and then had to wait for the process to complete to begin the next extension switch. When it is factored in that the network administrator usually had to do the same process remotely at the other data center, the time required for the network administrator doubled. The simple two data center example is often much more complicated as there are often many different data centers that are interconnected into a complex WAN network. Therefore the update time was not just doubled but often tripled or more. Thus, the software update process became very demanding of precious network administrator time. A way to solve this ever increasing time demand for the extension switch software update process is desirable.

SUMMARY OF THE INVENTION

Embodiments according to the present invention improve the multi-site software update for extension switches by automatically assigning extension switches at each data center with a role and then providing state messages between the extension switches to stage software update operations between the various extension switches that are involved. This allows the network administrator to commence the software update process on the extension switches at each data center without waiting for any extension switch to complete operations. The extension switches communicate with each other and the software update process completes automatically, with all extension switches at all data centers updated without further network administrator input.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIGS. 5, 6 and 7 are flowcharts of hot code load operation according to the present invention.

DETAILED DESCRIPTION OF THE PREFERRED EMBODIMENTS

Figure 1:
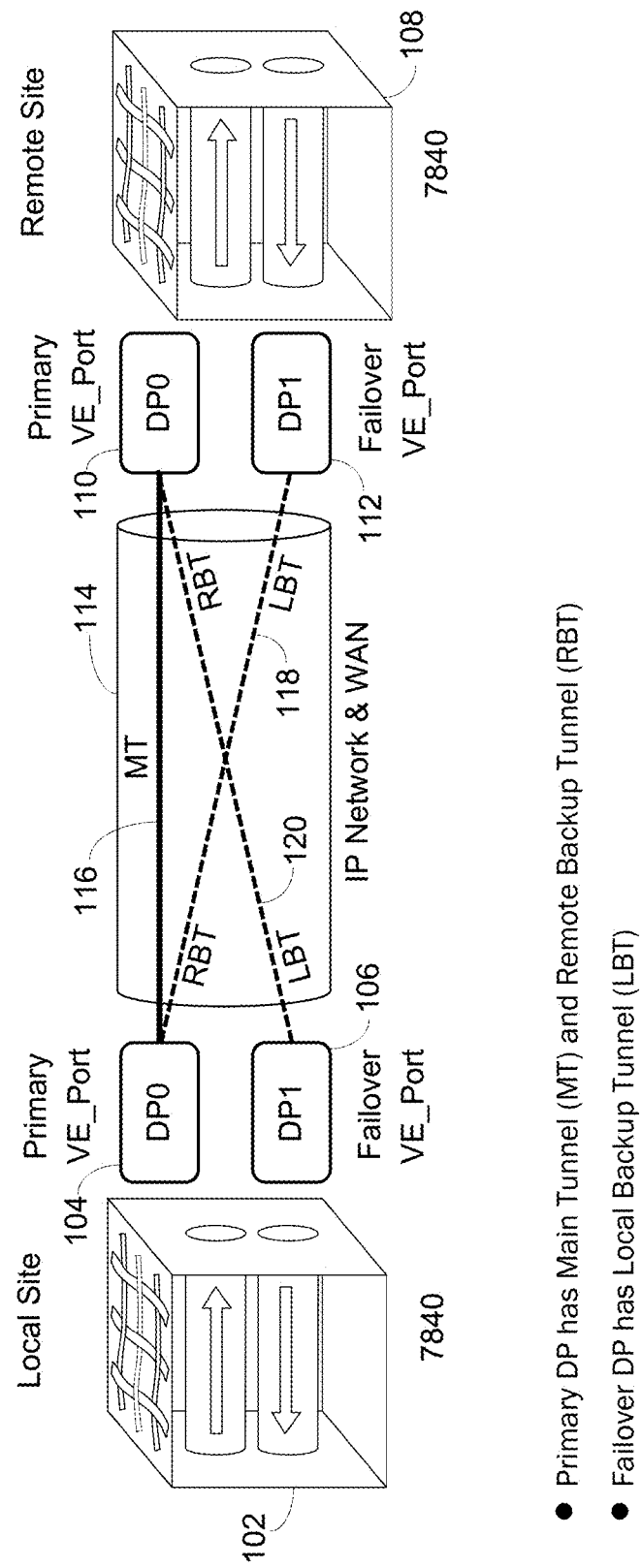
FIG. 1 is an illustration of extension tunnel connections according to the prior art.

It is common to have to connect two remote data centers. Various accelerators are available to accomplish this task. Among these accelerators are the Brocade® 7840 Extension Switch and related SX6 Extension Blade. For simplicity this discussion will just reference the 7840. Ethernet IP ports are used to interconnect a pair of 7840s across the Internet, the typical WAN. Local ports are both Fibre Channel and Ethernet, to allow extension of either type. Tunnels are developed between the 7840s, usually thought of as FCIP tunnels, though equivalently usable for IP extension. Each 7840 includes two data processing elements to provide failover capabilities, as each data processing element can form connections over the WAN. FIG. 1 illustrates the basic connections as done in the prior art and with preferred embodiments of the present invention. A local 7840 102 includes two data processing units DP0 104 and DP1 106. A local 7840 108 includes two data processing units DP0 110 and DP1 112. A tunnel 114 is developed between the local 7840 102 and the remote 7840 108. DP0 104 is the primary VE_Port, with DP1 106 being the failover VE_Port. Similarly, DP0 no is a primary VE_Port and DP1 112 is a failover VE_Port. A main tunnel (MT) link 116 is established between DP0 104 and DP0 no. A remote backup tunnel (RBT) link 118 is established between DP0 104 and DP1 112. A local backup tunnel (LBT) link 120 is established between DP1 106 and DP0 110. Failover at the remote end causes the active link to shift from MT link 118 to RBT link 118, while failover at the local end causes the active link to shift from MT 116 to LBT 120. It is noted that from the perspective of remote 7840 108, the RBT and LBT designations are reversed.

Figure 2:
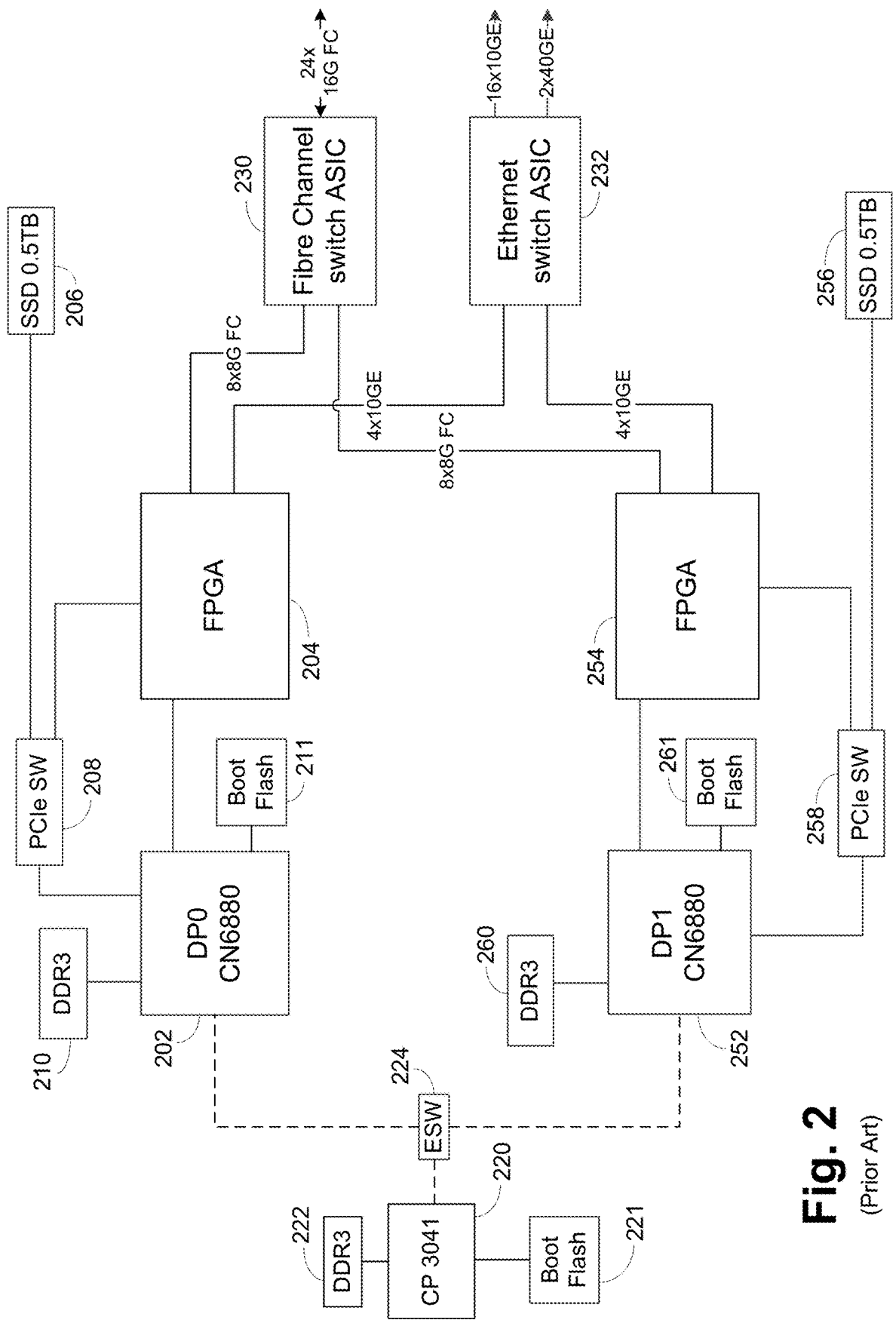
FIG. 2 is a block diagram of an exemplary extension device according to the prior art.

FIG. 2 illustrates an exemplary block diagram of a DP, such as DP0 104 and DP1 106, according to the prior art and with preferred embodiments of the present invention. The primary data processing components 202, 252 are preferably multi-core processing chips such as the CN6880 Octeon II with 32 MIPS64 processor cores and various other components, such as Ethernet and other I/O interfaces. Each data processing component 202, 252 includes an accompanying FPGA 204, 254, respectively, to provide miscellaneous functions needed to accelerate the relevant protocols. An SSD memory 206, 256 is coupled through a PCIe switch 208, 258 to the data processing component 202, 252 and the FPGA 204, 254 to provide firmware images and the like. DRAM 210, 260 is connected to the respective data processing component 202, 252 to provide operating memory. Boot flash memory 211, 261 is connected to the respective data processing component 202, 252 to provide boot software. A controller CPU 220, such as an NXP CP 3041, is provided for overall control and management of operations. A DRAM 222 is connected to the controller CPU 220. Boot flash memory 221 is connected to the controller CPU 220. Preferably each boot flash memory 211, 221, 261 includes primary and backup partitions for high availability. A switch 224 is used to connect the controller CPU 220 to each data processing component 202, 252. A Fibre Channel switch ASIC 230 is connected to each FPGA 204, 254 to provide FC connectivity. An Ethernet switch ASIC 232 is connected to each FPGA 204, 254 to provide Ethernet connectivity, such as to a local LAN or to the WAN.

Figure 3A:
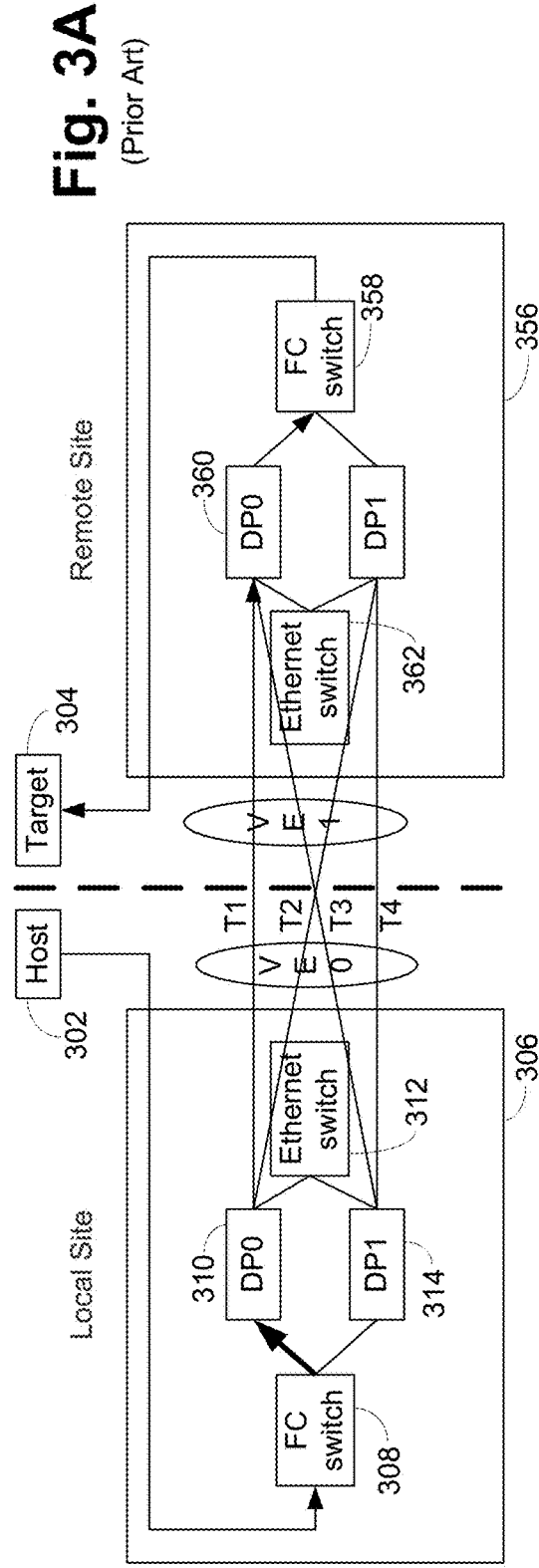
FIGS. 3A and 3B illustrate failover operation according to the prior art.
Figure 3B:
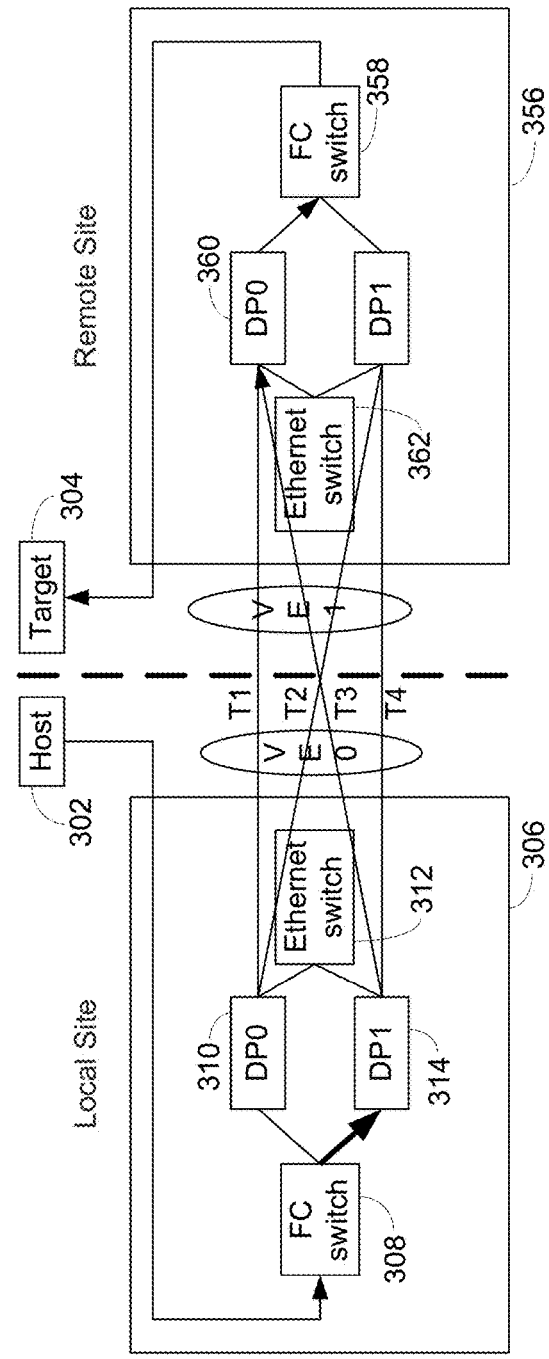

FIG. 3A illustrates data flow from a host 302 to a remote target 304, with local and remote 7840s 306, 356 in normal state according to the prior art. The data flows from host 302 to FC switch 308 to DP0 310 to Ethernet switch 312, across the WAN to Ethernet switch 362 to DP0 360 to FC switch 358 to target 304. FIG. 3B illustrates operation when DP0 310 has failed and the path has failed over to use DP1 314. The data is directed to DP1 314 by FC switch 308. DP1 314 provides the data to Ethernet switch 312, which provides the data to Ethernet switch 362, which provides the data to DP0 360, with the data flow then proceeding as in FIG. 3A.

As is well known, it is normal practice to update software and firmware on devices. The following process, referred to as hot code load (HCL), has been utilized to upgrade the firmware on a 7840 in the prior art.

The basic idea behind the HCL is to use half of the hardware as a backup. Although this backup is configured with IP addresses and TCP users will create connections, no data will flow through it during normal operation. When the SE will be informed of a failover, this backup will be used temporarily to pass data. Once the software has been updated, the temporary data flows will failback to the original. This process of failover and failback will continue until all software has been changed. This technique significantly reduces the amount of software required to support HCL.

The above was described from the perspective of an active/passive configuration, where one DP is not processing data. Operation is similar in an active/active configuration.

Figure 4:
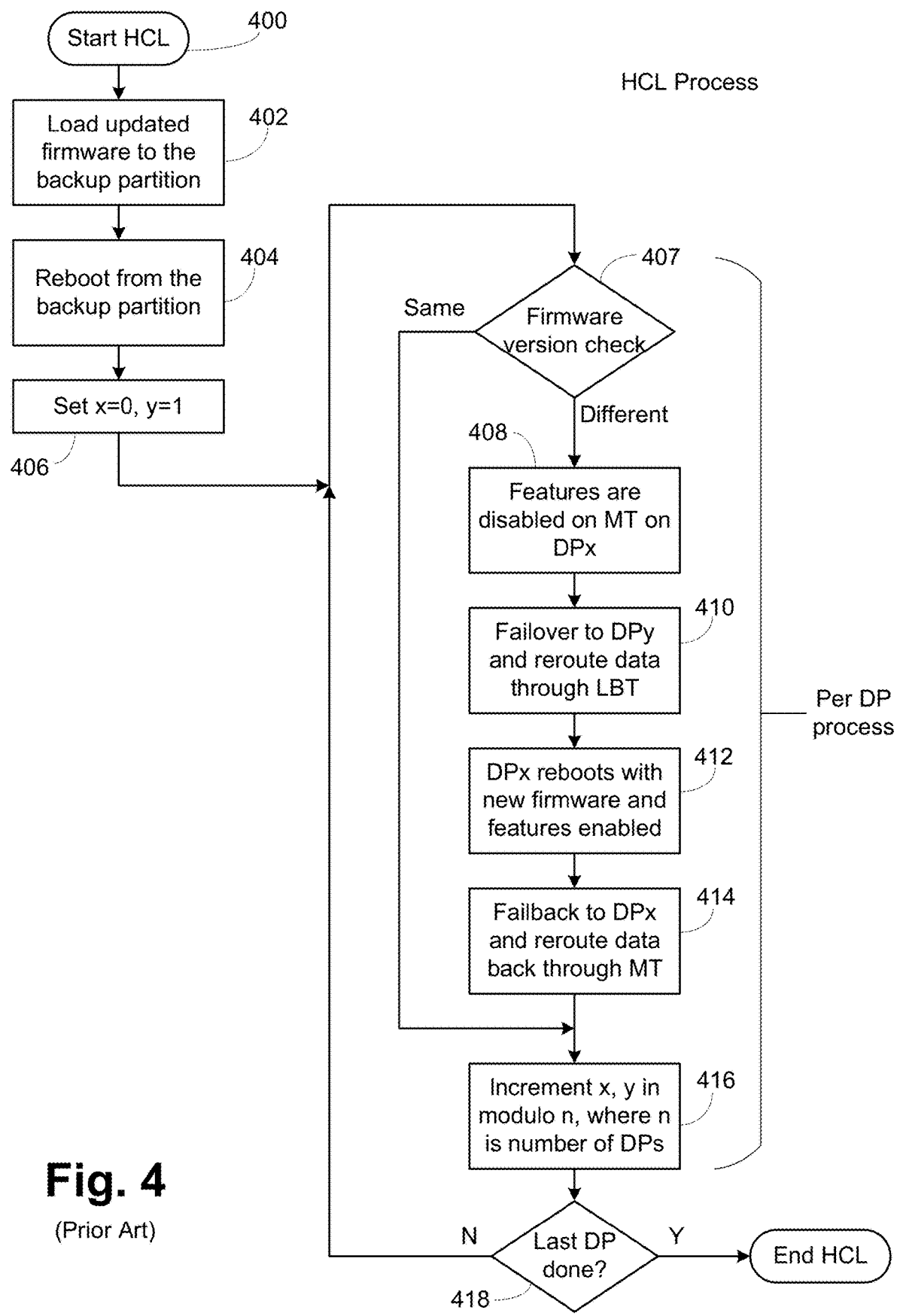
FIG. 4 is a flowchart of hot code load operations according to the prior art.

A more detailed explanation of prior art HCL operations is provided here and shown in FIG. 4. The HCL process commences at step 400 on request from the network administrator. In step 402, the running firmware writes an updated version of the firmware to the backup partition of the boot flash memories 211, 221, 261 of the control processor and DPs. In step 404, the control processor reboots from the backup partition with the updated, new firmware. In step 406, control variables are set, the x variable indicating the DP being updated and the y variable being the DP to which the flows are failed over.

In step 407 the control processor software performs a version check on the software executing on the DP. The CP software communicates with the DP instance software to exchange any initial version information, and then synchronize any configuration/state information. If a version mismatch is detected between the firmware version executing on the control processor and that running on the DP, the HCL process for that DP will start at step 408. If the version between CP and DP is the same, then no code balancing is necessary for this DP and operation can proceed onto the next DP, so operation moves to step 416, described below.

In the first pass, the local DP0 is updated with the new firmware using the following process.

In step 408, perform feature disable processing on the MT on DP0. Features such as FICON (fiber connection), advanced compression modes and FCP (Fibre Channel Protocol) provide advanced and/or licensed capabilities and need to be smoothly terminated.

In step 410, by triggering a failover, traffic from the MT is rerouted to DP1 through the LBT so that data traffic can continue between the switches. In-order data delivery is maintained.

In step 412, DP0 reboots with the new firmware, preferably from the backup partition that was previously updated in step 402, but from an alternate location that has been loaded using a step not illustrated if desired, and the configuration is reloaded and the features are restarted.

In step 414, the traffic from the LBT is failed-back to DP0 to flow through the MT. In step 416, the x and y values are incremented, using a modulo n value, where n is the number of DPs. In the illustrated case, n is two. So after step 416, x has a value of 1 and y has a value of 0. With this, the updating of DP0 is complete.

In the second pass, the local DP1 is updated with new firmware using the same process of steps 407 to 416.

In step 407 the CP and DP firmware versions are compared. If different, in step 408, feature disable processing on the MT on DP1 is performed. In step 410, traffic from the MT is rerouted to DP0 through the LBT so that data traffic can continue between the switches. In-order data delivery is maintained. In step 412, DP1 reboots with the new firmware and the configuration and features are reloaded. In step 414 traffic from the LBT is failed-back to DP1 through the MT. In step 416 the x and y values are incremented.

After firmware is updated on DP1 and all MTs, LBT, and RBT are online, in step 418 it is determined if all DPs have been updated. If not, then operation returned to step 408. If all DPs are done, the extension HCL firmware update for that extension switch is completed.

It is noted that some of the steps are performed by the control processor and other steps by the DP. Messaging between the control processor and the DP is used as necessary.

This process allows the firmware to be updated without halting data flow but has to be performed manually for each 7840, either local or remote, with only one connected 7840 performing the process at a time. In configurations where multiple 7840s are connected, i.e. where a single 7840 has tunnels to multiple other 7840s, it becomes an administrative burden, as the network administrator has to monitor each 7840 for completion and then begin operations on the next 7840.

Embodiments according to the present invention allow multiple connected 7840s to be updated at one time. The network administrator loads the updated firmware onto each single 7840 and starts the HCL process on each 7840, both local and remote, without waiting for any individual 7840 to complete the HCL process. The 7840s will proceed and complete HCL without further administrator action. This frees up a great deal of administrator time for other tasks. Additionally, multiple 7840s can upgrade at the same time in many cases, reducing the total time for the entire process as well.

To begin the process, in step 502 the new firmware is loaded into the backup partitions of the boot flash memories by the executing firmware and then in step 504 the new firmware is loaded onto each control processor and the HCL process is initiated. In step 506 the x value is set to 0 and the y value is set to 1.

In step 508, before doing an upgrade on a particular DP, the DP checks all tunnels going to all sites to see if any of them are acting as Remote HCL NODEs or not. If not, in step 510, the DP marks all tunnels as Local HCL NODE and then, in step 512, sends PREP message to all remote sites over the tunnels.

Referring to FIG. 6, at each remote site, the PREP process will be done as shown.

In step 602, the DP receives the PREP message for the remote DP. In step 604, the DP checks to determine if the node is acting as a Local HCL NODE or not. If not, in step 606 the DP marks the receiving VE and tunnel as Remote HCL NODE and in step 608 sends an accept response to the PREP message. If the node is a Local HCL NODE, in step 610 the DP sends a reject response to the PREP message with proper error code.

Figure 5:
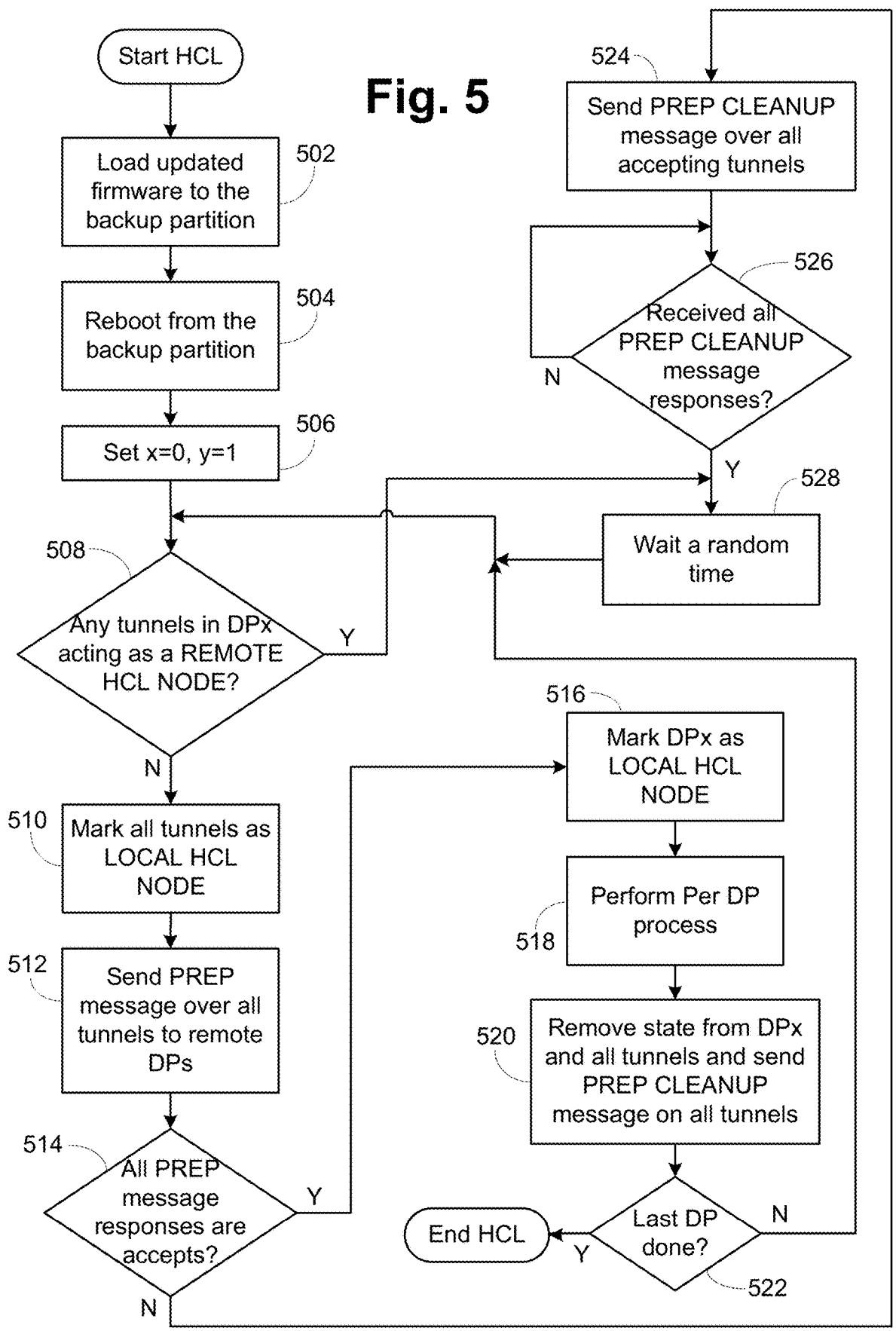

Returning to FIG. 5, after all the PREP responses come back, in step 514 it is determined if all are accept responses. If so, then in step 516, the current DP is marked as a Local HCL NODE. Next, in step 518, the particular DP is upgraded using the Per DP Process of steps 407 to 416, as shown in FIG. 4. After the DP is upgraded in step 518, in step 520 the Local HCL NODE status is removed from the DP and a PREP CLEANUP message is sent over all tunnels. In step 522 it is determined if this was the last DP. If so, then the HCL process has completed for the 7840. If not the last DP, control returns to step 508 for the next DP.

In step 514, if any of the PREP message responses are reject responses, start the CLEANUP process in step 524 by sending PREP CLEANUP messages to all nodes that accepted the PREP message to cleanup their Remote HCL status.

The CLEANUP operation is shown in FIG. 7. In step 702 the PREP CLEANUP message is received by a DP over a tunnel. In step 704 the REMOTE HCL NODE state is cleared for that tunnel. In step 706, an accept response is sent back over the tunnel.

After all of the PREP CLEANUP responses are received in step 526, then in step 528, wait for 1 DP reboot time (random from 3-5 minutes) and start again at step 508. Since the back out time is random, if two sites start HCL at the same time, one site will always win in all conditions and go first, with the losing site proceeding after the winning site completes.

In step 508, if one of the tunnels in the DP is marked REMOTE HCL NODE, meaning that the DP at the other end of the tunnel is upgrading, operation proceeds to step 528 to wait and then retry step 508.

As above, some of the steps are performed by the control processor and other steps by the DP. Messaging between the control processor and the DP is used as necessary.

Thus, the administrator can start all of the sites at one time (or close) and the process will ultimately complete on all sites without further operations or supervision by the administrator.

An alternate embodiment for FIG. 6 changes the decision block from just the specific tunnel receiving the PREP message being in LOCAL HCL MODE to any tunnel on the DP being in LOCAL HCL MODE. This can prevent certain deadlock conditions.

Figure 8A:
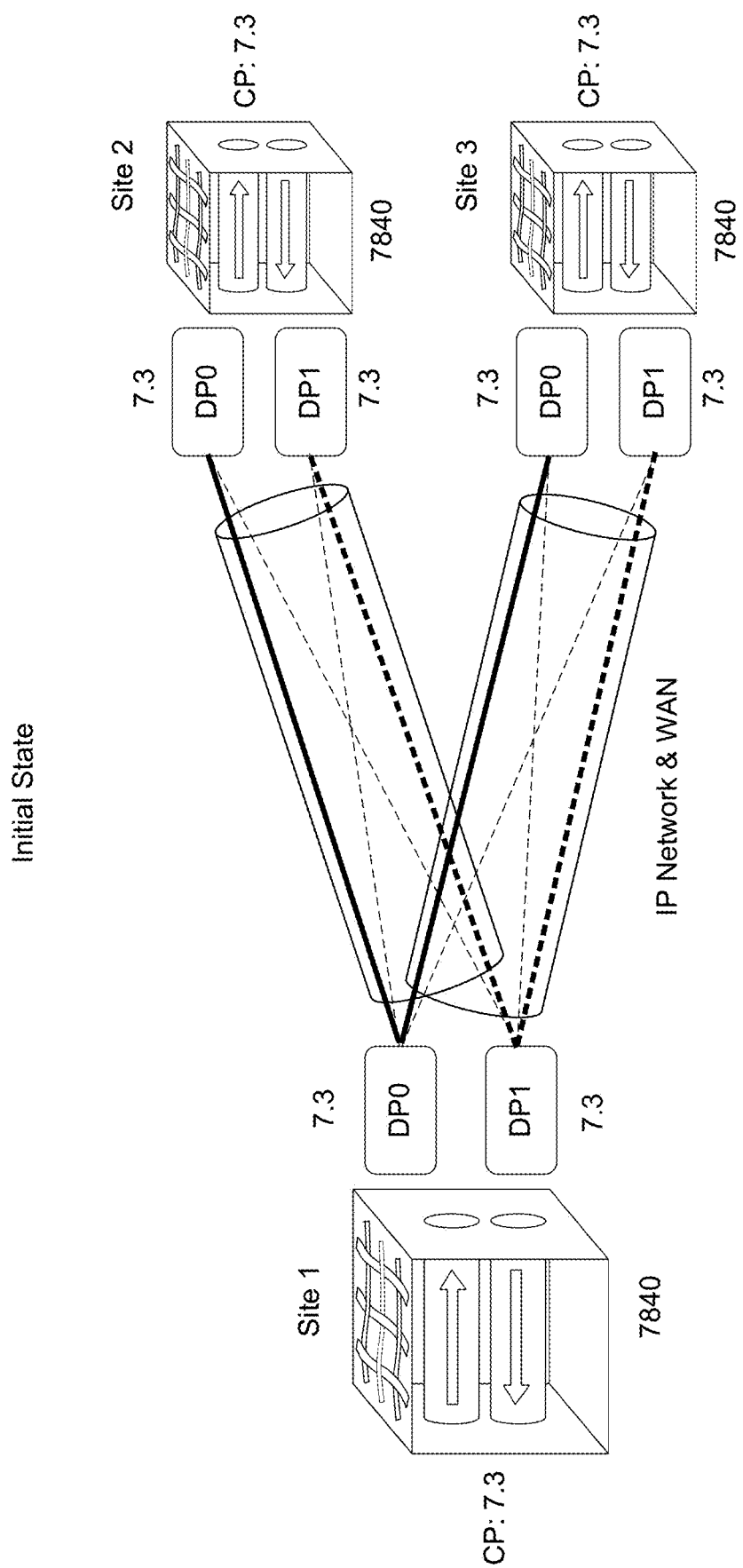
FIGS. 8A-8E illustrate hot code load operation for multiple sites at once according to the present invention.
Figure 8B:
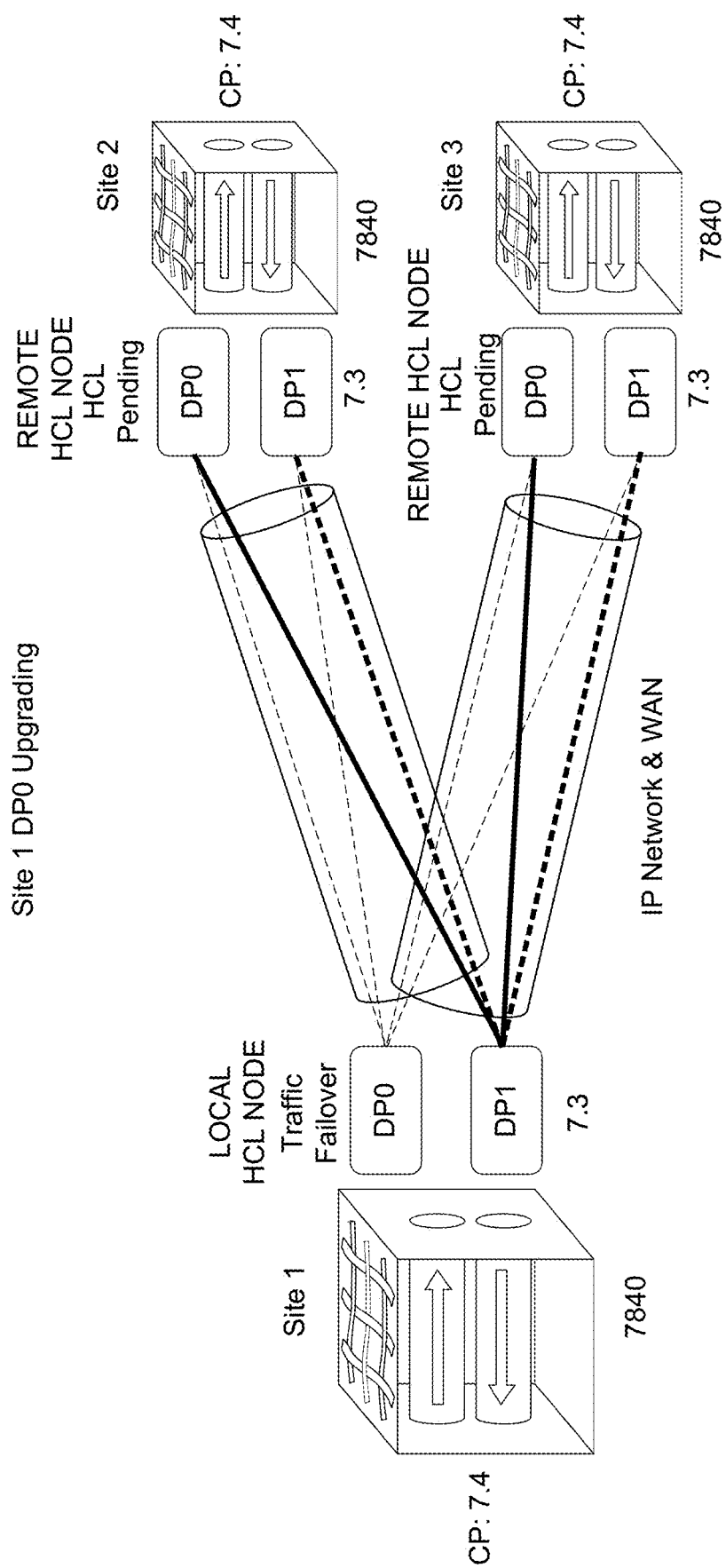
Figure 8C:
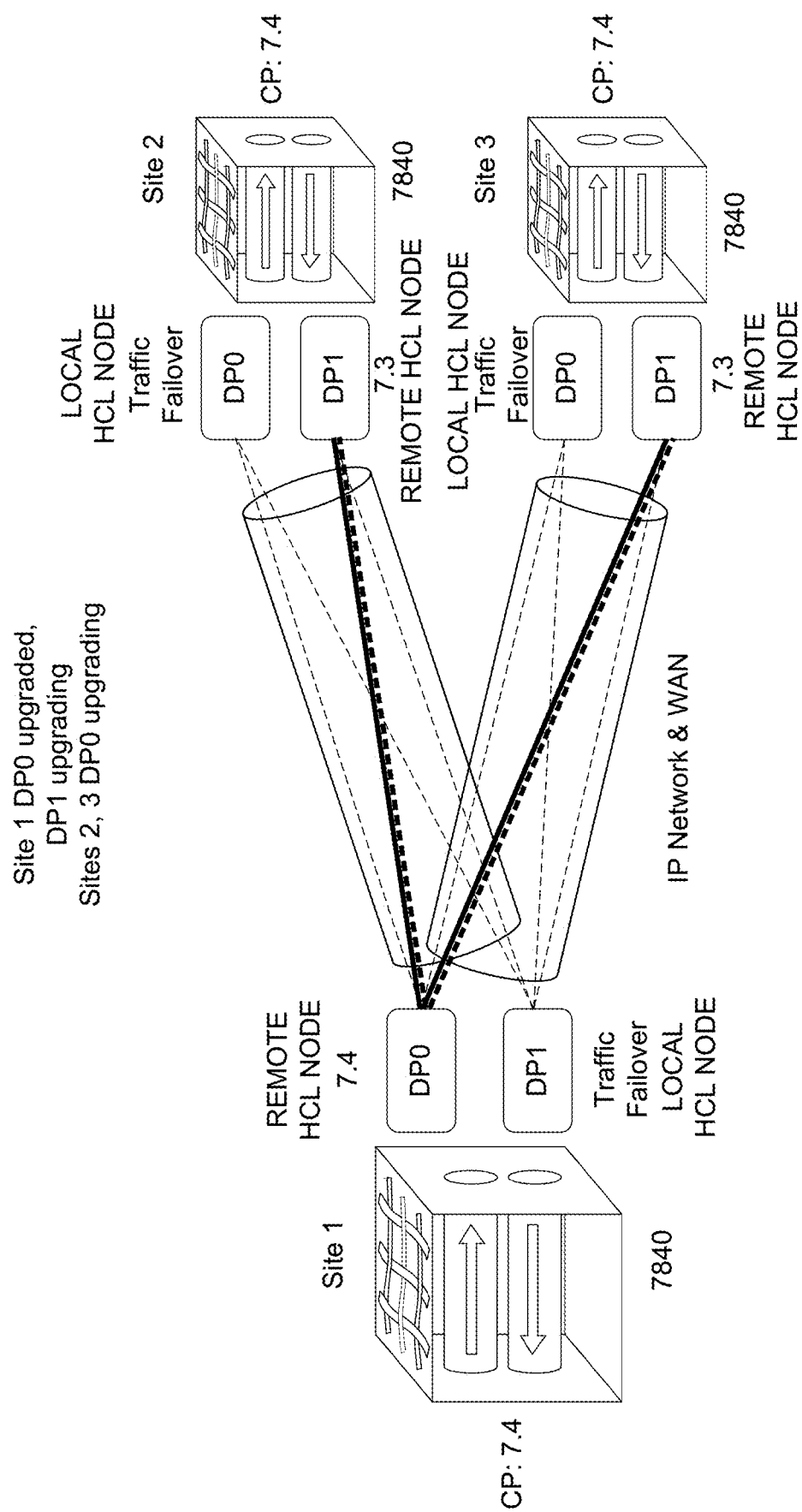
Figure 8D:
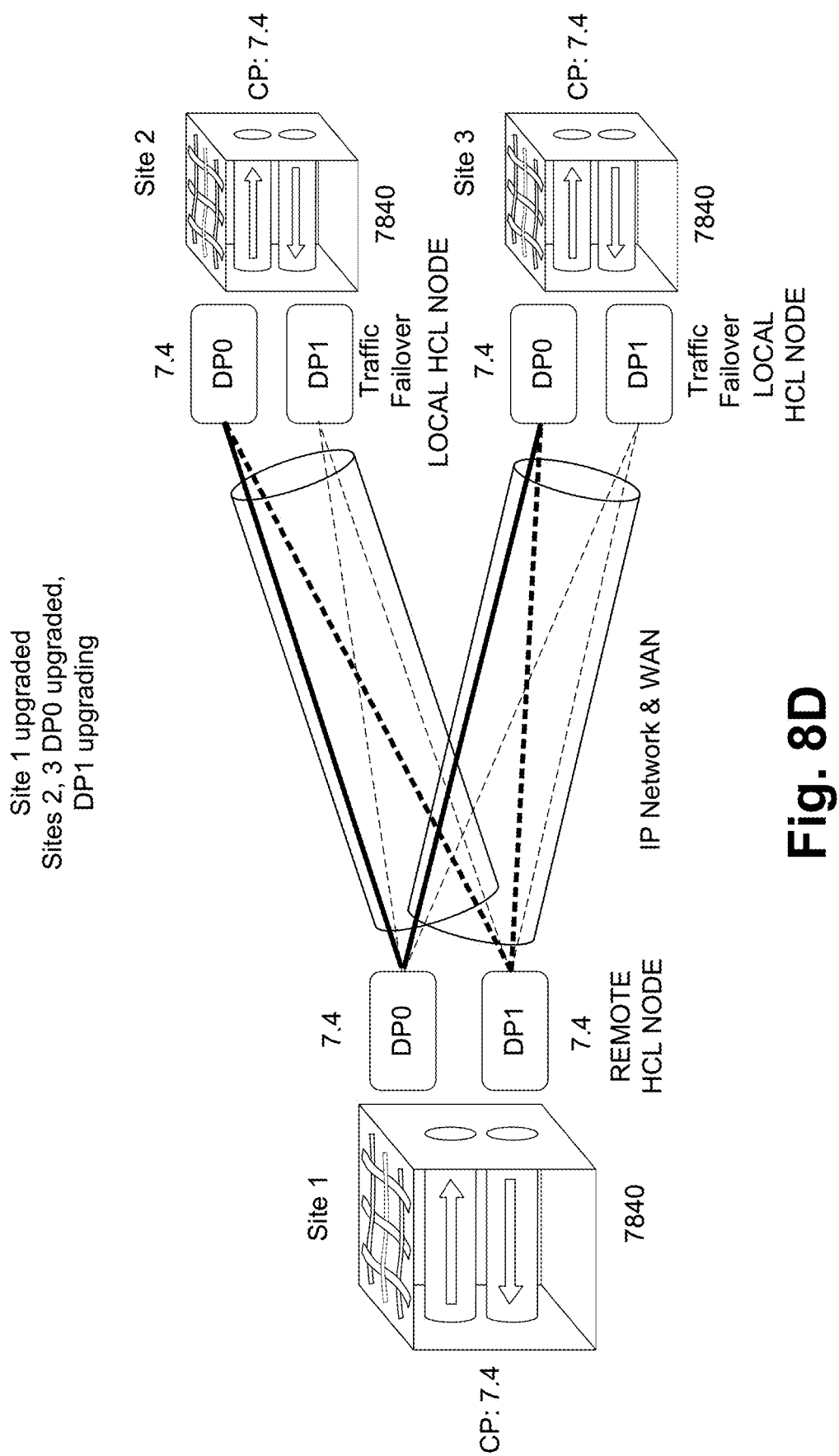
Figure 8E:
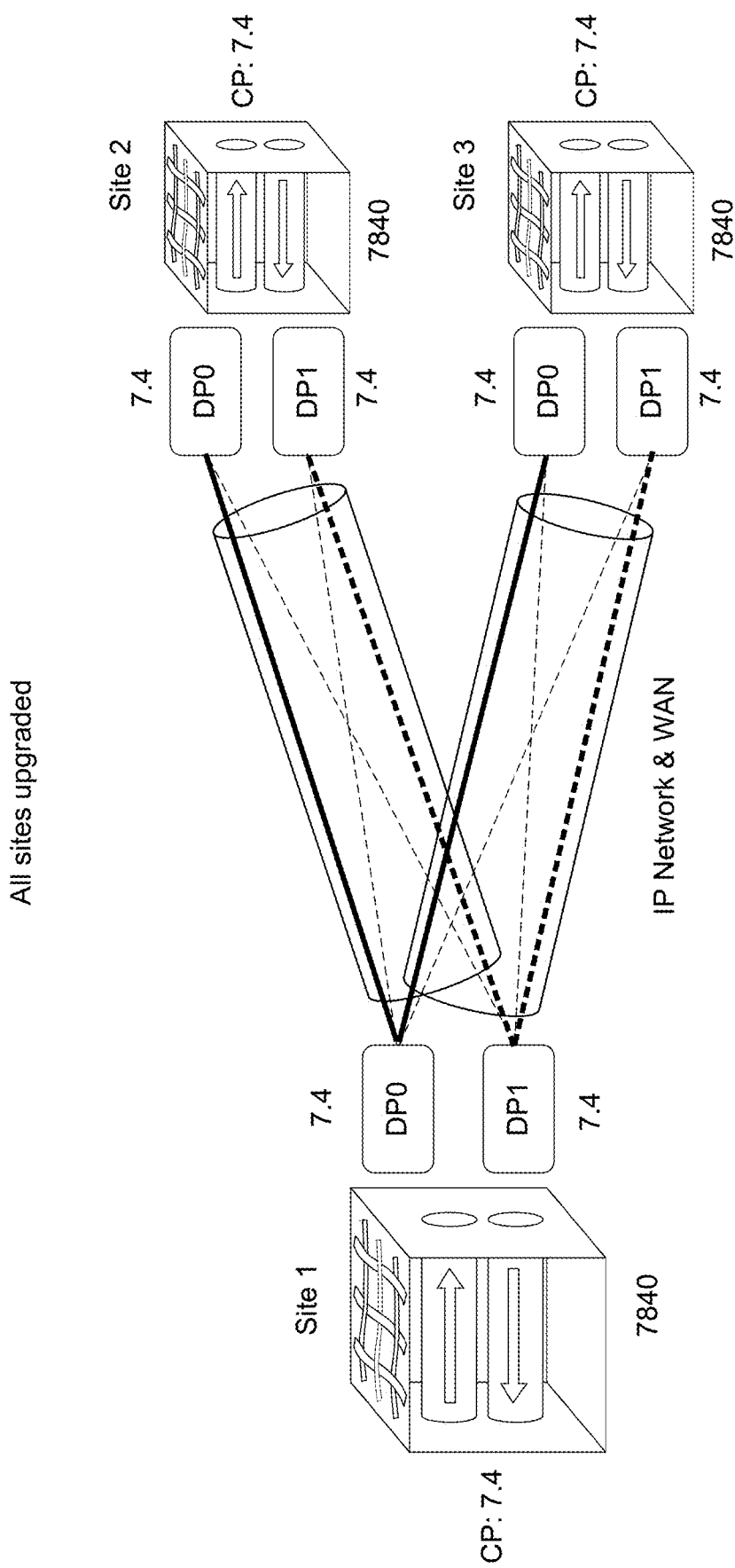

One further advantage of this protocol is that it can allow parallel upgrade of two sites that are not directly connected to each other. For example, consider the Site 2—Site 1—Site 3 topology shown in FIGS. 8A-8E. If HCL starts on all three sites, Site 2 and Site 3 can be upgraded at the same time. Indeed, all three sites can be undergoing upgrading at the same time. FIG. 8A illustrates the starting condition where the CPs and the DPs are all at version 7.3. In FIG. 8B, all CPs have been upgraded to version 7.4 (per steps 502 and 504) and the HCL process has been triggered at all three sites. DP0 on Site 1 has taken the lead and is upgrading to version 7.4, as indicated by the LOCAL HCL NODE state and the indication that traffic failover has occurred, while the DP0s at sites 2 and 3 are locked in REMOTE HCL MODE state, with HCL Pending. All traffic is flowing through the DP1s at each site. In FIG. 8C, site 1 DP0 has completed the upgrade to version 7.4 and site 1 DP1, site 2 DP0 and site 3 DP0 are undergoing the upgrade. All traffic is flowing through upgraded DP0 at site 1 and DP1 at sites 2 and 3. In FIG. 8D, site 1 has completed the upgrade to version 7.4, while DP0 at sites 2 and 3 have upgraded and DP1 at sites 2 and 3 are upgrading. Site 1 has traffic flowing through DP0 and DP1 as normal but sites 2 and 3 have all traffic flowing through DP0. In FIG. 8E, sites 2 and 3 DP1 have finished the upgrading so now all sites are fully upgraded to version 7.4 and traffic flow has returned to normal as in FIG. 8A.

While FIGS. 8A-8E have illustrated operations on three sites at one time, it is appreciated that operation performs similarly for only two sites and can operate with greater than three sites. Indeed, the most common situation may be just the two sites connected by a tunnel, but operation is not limited to just that configuration.

By developing states and having the extension switches communicate state, the extension switches at various locations can cooperate to manage the firmware upgrade operation, while maintaining data flows. This allows the network administrator to request the HCL process on the various extension switches at the various sites without waiting for any site to complete. This frees up valuable network administrator time by removing the manual process for each site, which had to be performed separately for each site.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A local data transmission device comprising:
   a local control processor;
   two local wide area network (WAN) data processing devices, each local WAN data processing device for communicating with a first remote data transmission device which includes two remote WAN data processing devices, each local WAN data processing device including a processor, each processor coupled to the local control processor;
   memory coupled to at least one of the local control processor and each local WAN data processing device processor, the memory including state storing memory and versioned firmware for executing on the local control processor and each local WAN data processing device processor; and
   two local WAN ports, one local WAN port for each local WAN data processing device and coupled to that local WAN data processing device, the two local WAN ports for coupling with complementary two remote WAN ports on the first remote data transmission device to provide main and backup links between the local data transmission device and the first remote data transmission device, wherein
   the versioned firmware includes programs that execute on the local control processor and each local WAN data processing device processor to cause the local control processor and each local WAN data processing device processor collectively to maintain firmware upgrade state, provide messages to the first remote data transmission device and receive messages from the first remote data transmission device to allow and manage the updating of the versioned firmware to a different version to be performed automatically and concurrently on the local data transmission device and the first remote data transmission device while data is flowing without interruption between the local data transmission device and the first remote data transmission device,
   each local WAN data processing device is further for communicating with a second remote data transmission device which includes two remote WAN data processing devices,
   the two local WAN ports are further for coupling with complementary two remote WAN ports on the second remote data transmission device to provide main and backup links between the local data transmission device and the second remote data transmission device,
   the versioned firmware further includes programs that execute on the local control processor and each local WAN data processing device processor to cause the local control processor and each local WAN data processing device processor collectively to maintain firmware upgrade state, provide messages to the second remote data transmission device and receive messages from the second remote data transmission device to allow and manage the updating of the versioned firmware to a different version to be performed automatically and concurrently on the local data transmission device and the second remote data transmission device while data is flowing without interruption between the local data transmission device and the second remote data transmission device, and
   the updating of the versioned firmware to a different version on the local data transmission device and the first remote data transmission device and the updating of the versioned firmware to a different version on the local data transmission device and the second remote data transmission device occur concurrently.

2. The local data transmission device of claim 1, wherein firmware upgrade state includes an indication of local or remote firmware update in process.

3. The local data transmission device of claim 2, wherein firmware upgrade state is maintained independently for each local WAN data processing device.

4. The local data transmission device of claim 1, wherein data flow without interruption is performed by failing over from one local WAN data processing device to the other local WAN data processing device prior to updating the firmware and then failing back from the other local WAN data processing device to the one local WAN data processing device after completing updating the firmware.

5. A data transmission system comprising:
   a local transmission device including:
      a local control processor;
      two local wide area network (WAN) data processing devices, each local WAN data processing device including a processor, each processor coupled to the local control processor;
      local memory coupled to at least one of the local control processor and each local WAN data processing device processor, the local memory including state storing memory and local versioned firmware for executing on the local control processor and each local WAN data processing device processor; and
      two local WAN ports, one local WAN port for each local WAN data processing device and coupled to that local WAN data processing device;
   a first remote transmission device including:
      a first remote control processor;
      two first remote wide area network (WAN) data processing devices, each first remote WAN data processing device including a processor, each processor coupled to the first remote control processor, each first remote WAN data processing device for communicating with the local data transmission device;
      first remote memory coupled to at least one of the first remote control processor and each first remote WAN data processing device processor, the first remote memory including first remote state storing memory and first remote versioned firmware for executing on the first remote control processor and each first remote WAN data processing device processor; and
      two first remote WAN ports, one first remote WAN port for each first remote WAN data processing device and coupled to that first remote WAN data processing device, the two first remote WAN ports for coupling with the two local WAN ports on the local data transmission device to provide main and backup links between the local data transmission device and the first remote data transmission device, wherein
   the local versioned firmware includes local programs that execute on the local control processor and each local WAN data processing device processor to cause the local control processor and each local WAN data processing device processor collectively to maintain local firmware upgrade state, provide messages to the first remote data transmission device and receive messages from the first remote data transmission device, the first remote versioned firmware includes first remote programs that execute on the first remote control processor and each first remote WAN data processing device processor to cause the first remote control processor and each first remote WAN data processing device processor collectively to maintain first remote firmware upgrade state, provide messages to the local data transmission device and receive messages from the local data transmission device, and the local programs and the first remote programs allow and manage the updating of the local and first remote versioned firmware to a different version to be performed automatically and concurrently on the local data transmission device and the first remote data transmission device while data is flowing without interruption between the local data transmission device and the first remote data transmission device; and a second remote transmission device including:

a second remote control processor;

two second remote wide area network (WAN) data processing devices, each second remote WAN data processing device including a processor, each processor coupled to the second remote control processor, each second remote WAN data processing device for communicating with the local data transmission device;

second remote memory coupled to at least one of the second remote control processor and each second remote WAN data processing device processor, the second remote memory including second remote state storing memory and second remote versioned firmware for executing on the second remote control processor and each second remote WAN data processing device processor; and two second remote WAN ports, one second remote WAN port for each second remote WAN data processing device and coupled to that second remote WAN data processing device, the two second remote WAN ports for coupling with the two local WAN ports on the local data transmission device to provide main and backup links between the local data transmission device and the second remote data transmission device, wherein the local versioned firmware includes local programs that execute on the local control processor and each local WAN data processing device processor to cause the local control processor and each local WAN data processing device processor collectively to maintain local firmware upgrade state, provide messages to the second remote data transmission device and receive messages from the second remote data transmission device, the second remote versioned firmware includes second remote programs that execute on the second remote control processor and each second remote WAN data processing device processor to cause the second remote control processor and each second remote WAN data processing device processor collectively to maintain second remote firmware upgrade state, provide messages to the local data transmission device and receive messages from the local data transmission device, the local programs and the second remote programs allow and manage the updating of the local and second remote versioned firmware to a different version to be performed automatically and concurrently on the local data transmission device and the second remote data transmission device while data is flowing without interruption between the local data transmission device and the second remote data transmission device, and the updating of the versioned firmware to a different version on the local data transmission device and the first remote data transmission device and the updating of the versioned firmware to a different version on the local data transmission device and the second remote data transmission device occur concurrently.

6. The data transmission system of claim 5, wherein the local and first remote firmware upgrade state each includes an indication of local or first remote firmware update in process.

7. The data transmission system of claim 6, wherein the local and first remote firmware upgrade state is maintained independently for each local and first remote WAN data processing device.

8. The data transmission system of claim 5, wherein data flow without interruption is performed by failing over from one local WAN data processing device to the other local WAN data processing device prior to updating the local versioned firmware and then failing back from the other local WAN data processing device to the one local WAN data processing device after completing updating the local versioned firmware and by failing over from one first remote WAN data processing device to the other first remote WAN data processing device prior to updating the first remote versioned firmware and then failing back from the other first remote WAN data processing device to the one first remote WAN data processing device after completing updating the first remote versioned firmware.

9. A method comprising:

maintaining firmware upgrade state of a local transmission device, the local transmission device having:

a local control processor;

two local wide area network (WAN) data processing devices, each local WAN data processing device for communicating with a first remote data transmission device which includes two remote WAN data processing devices, each local WAN data processing device including a processor, each processor coupled to the local control processor;

memory coupled to at least one of the local control processor and each local WAN data processing device processor, the memory including state storing memory and versioned firmware for executing on the local control processor and each local WAN data processing device processor; and two local WAN ports, one local WAN port for each local WAN data processing device and coupled to that local WAN data processing device, the two local WAN ports for coupling with complementary two remote WAN ports on the first remote data transmission device to provide main and backup links between the local data transmission device and the first remote data transmission device;

providing messages to the first remote data transmission device;

receiving messages from the first remote data transmission device;

allowing and managing the updating of the versioned firmware to a different version to be performed automatically and concurrently on the local data transmission device and the first remote data transmission device while data is flowing without interruption between the local data transmission device and the first remote data transmission device, communicating, by each local WAN data processing device, with a second remote data transmission device which includes two remote WAN data processing devices, wherein the two local WAN ports are further for coupling with complementary two remote WAN ports on the second remote data transmission device to provide main and backup links between the local data transmission device and the second remote data transmission device;

maintaining firmware upgrade state;

providing messages to the second remote data transmission device;

receiving messages from the second remote data transmission device; and allowing and managing the updating of the versioned firmware to a different version to be performed automatically and concurrently on the local data transmission device and the second remote data transmission device while data is flowing without interruption between the local data transmission device and the second remote data transmission device, wherein the updating of the versioned firmware to a different version on the local data transmission device and the first remote data transmission device and the updating of the versioned firmware to a different version on the local data transmission device and the second remote data transmission device occur concurrently.

10. The method of claim 9, wherein firmware upgrade state includes an indication of local or remote firmware update in process.

11. The method of claim 10, wherein firmware upgrade state is maintained independently for each local WAN data processing device.

12. The method of claim 9, wherein data flow without interruption is performed by failing over from one local WAN data processing device to the other local WAN data processing device prior to updating the firmware and then failing back from the other local WAN data processing device to the one local WAN data processing device after completing updating the firmware.

* * * * *